H. KUENTZLER.
CALCULATING MACHINE.
APPLICATION FILED APR. 7, 1916.
1,305,124.
Patented May 27, 1919.
8 SHEETS—SHEET 4.
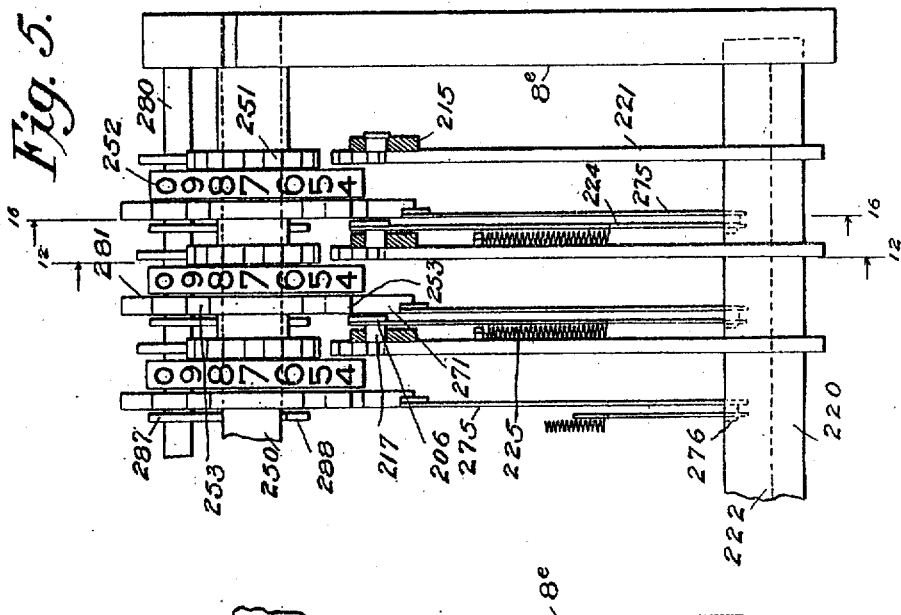
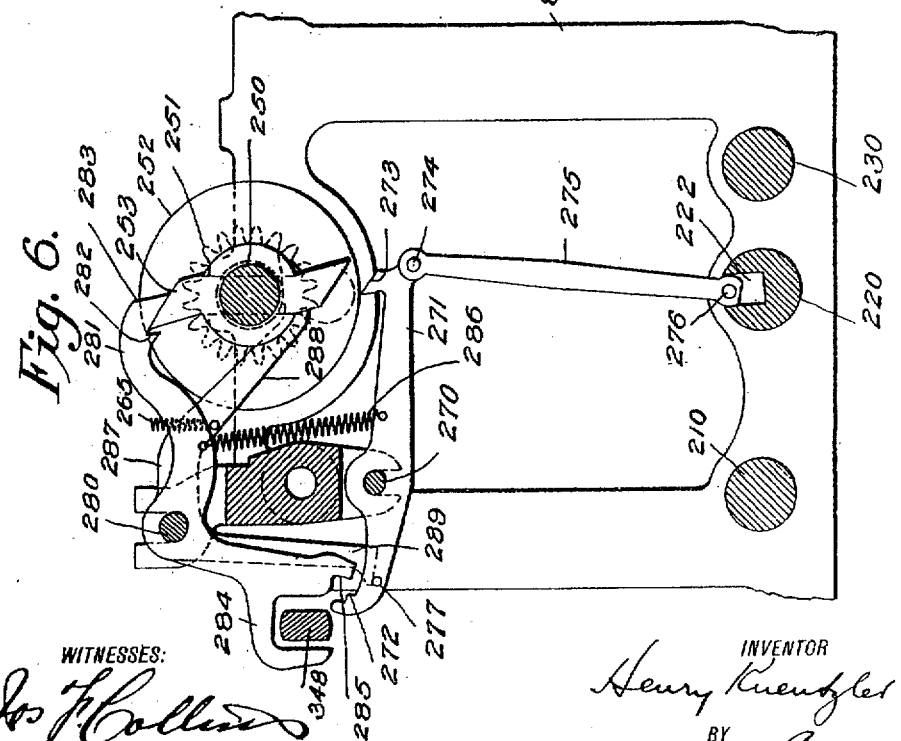

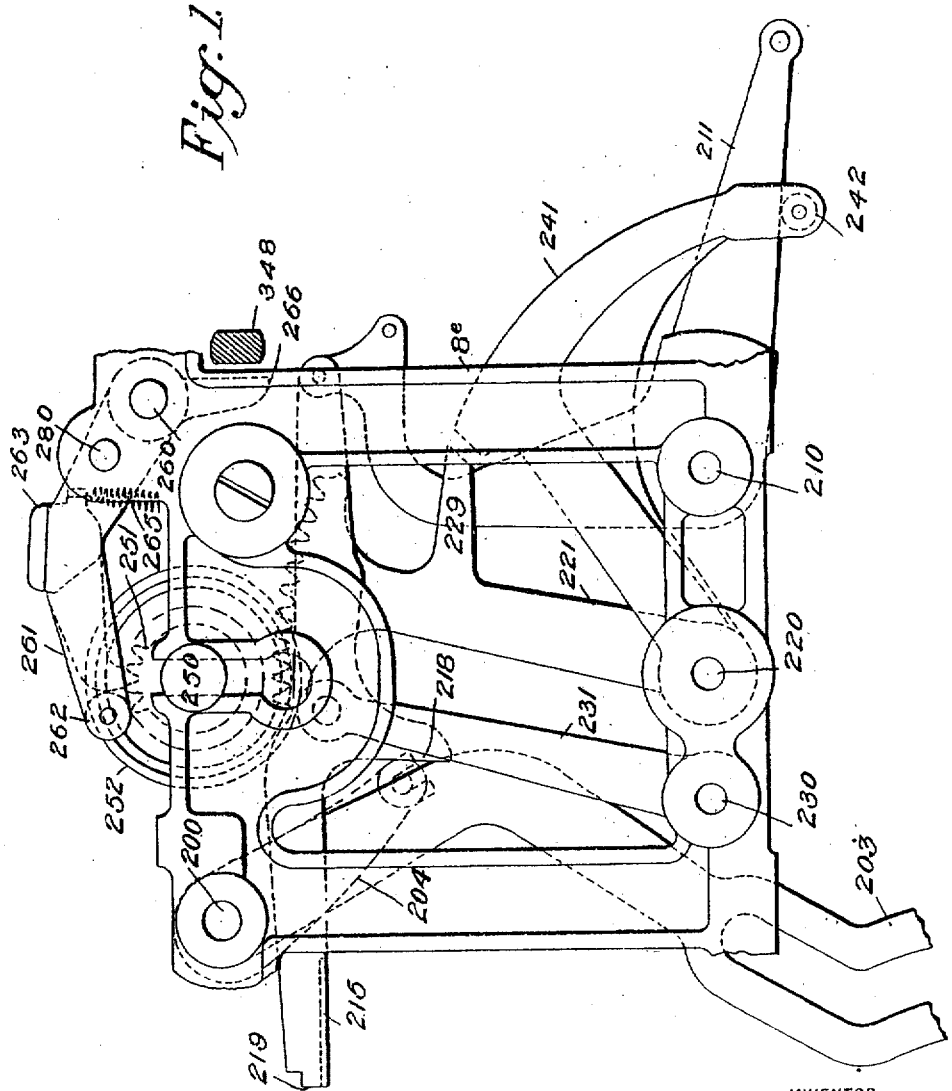

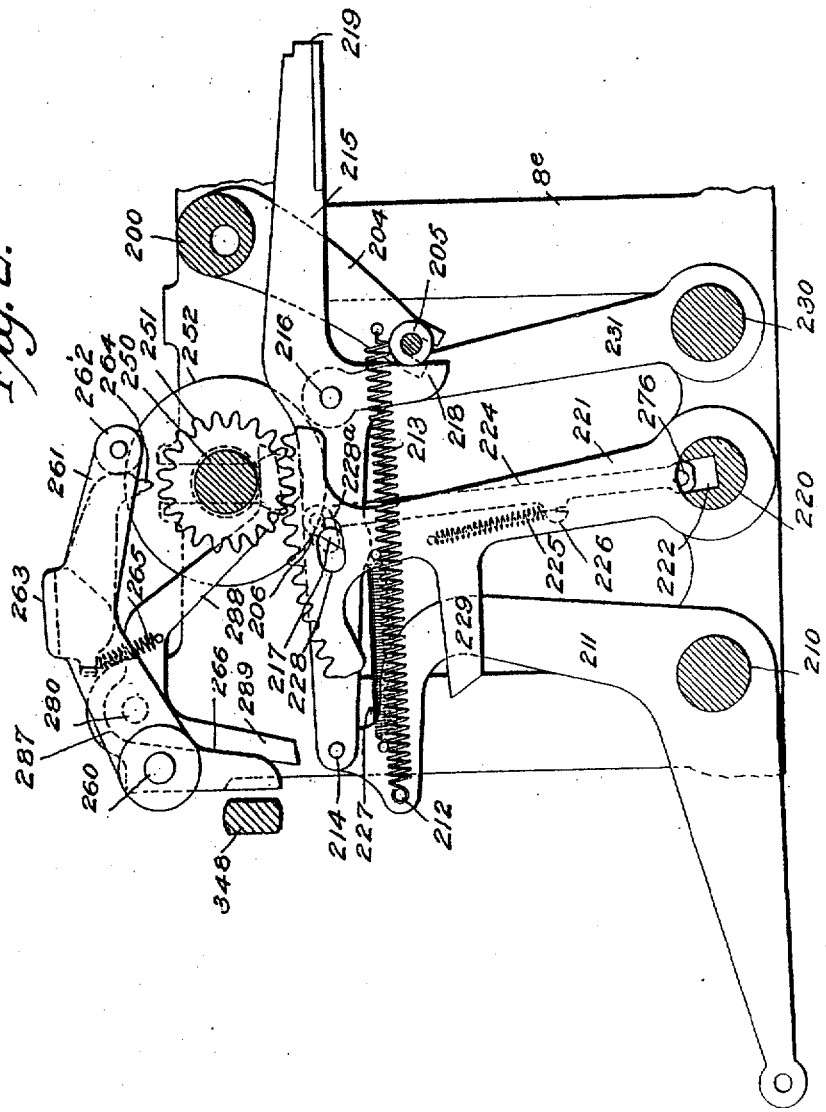

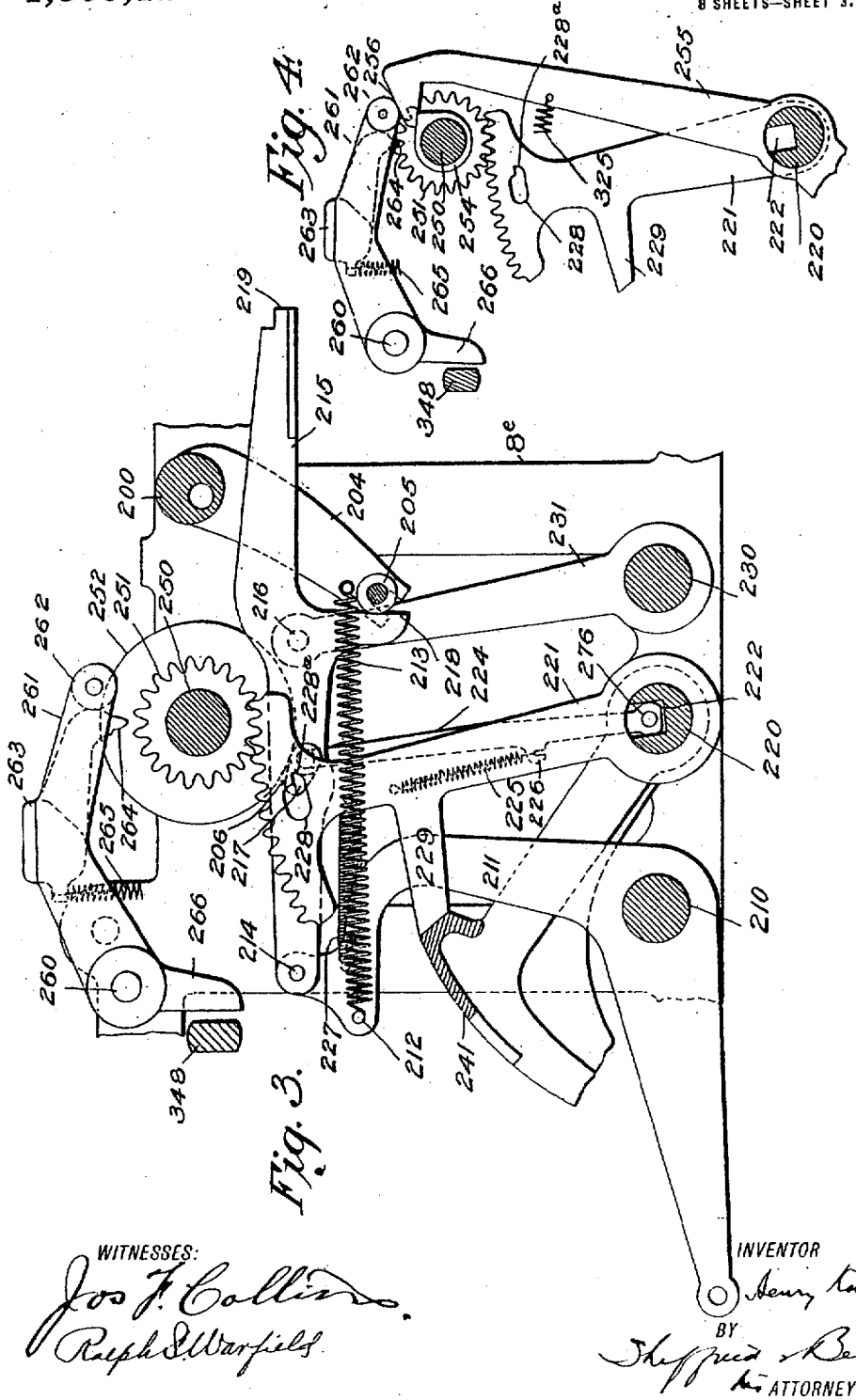

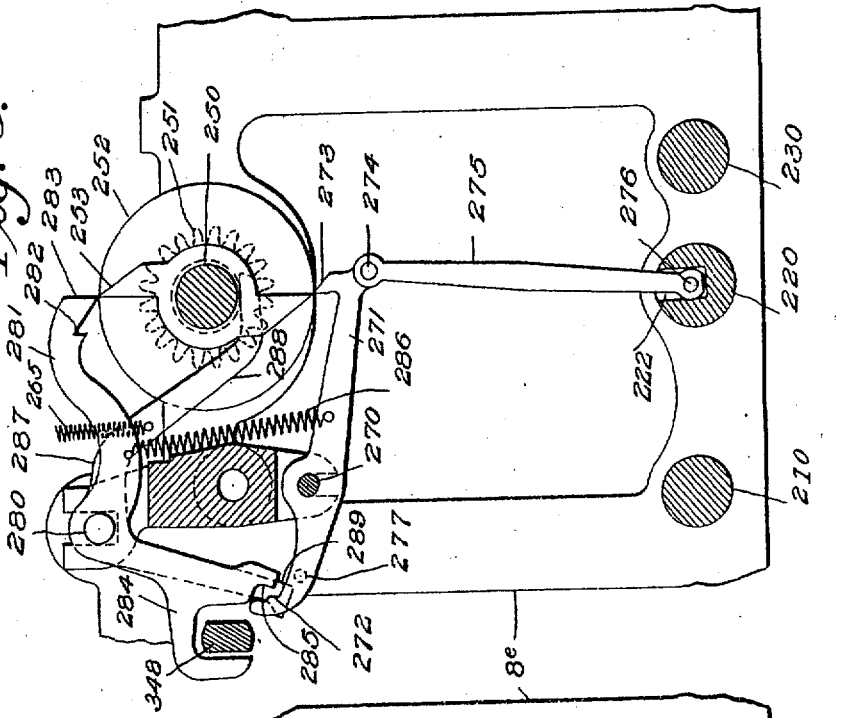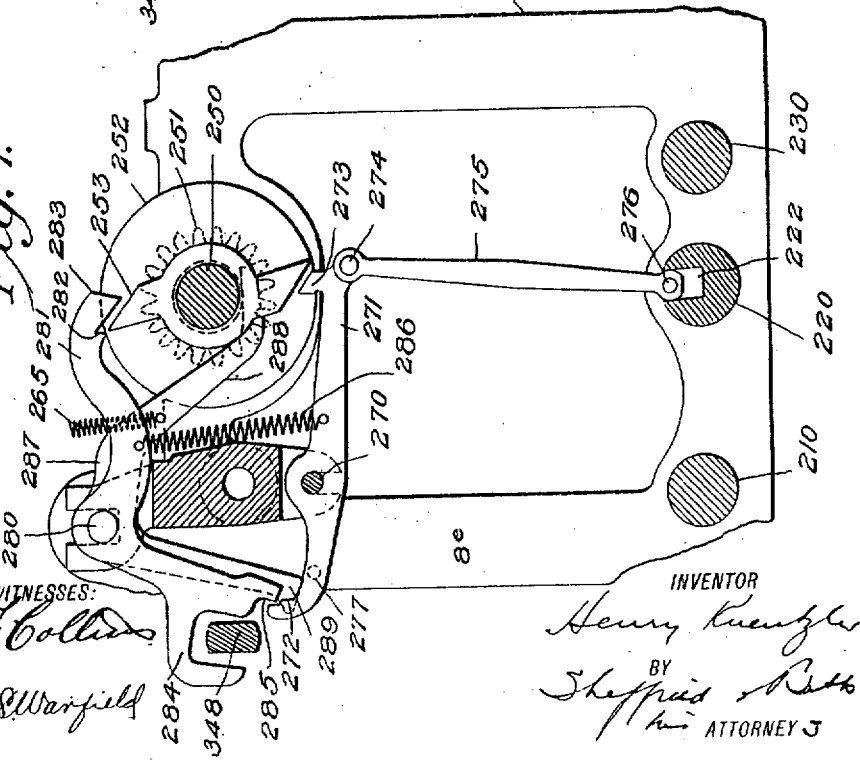

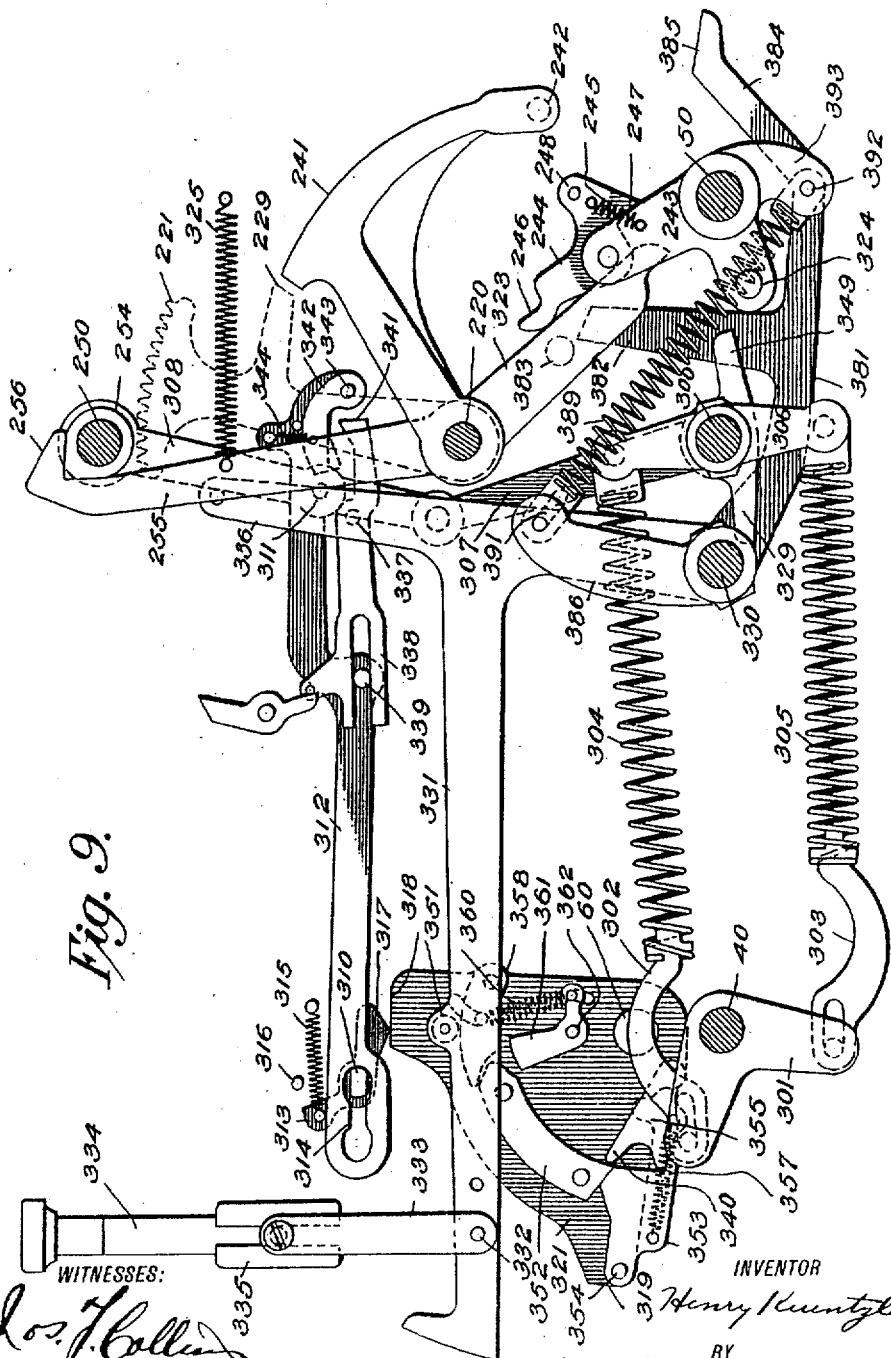

H. KUENTZLER.
CALCULATING MACHINE.
APPLICATION FILED APR. 7, 1916.

1,305,124.

Patented May 27, 1919.
8 SHEETS—SHEET 7.

Fig.10.

WITNESSES:

INVENTOR

BY

ATTORNEYS

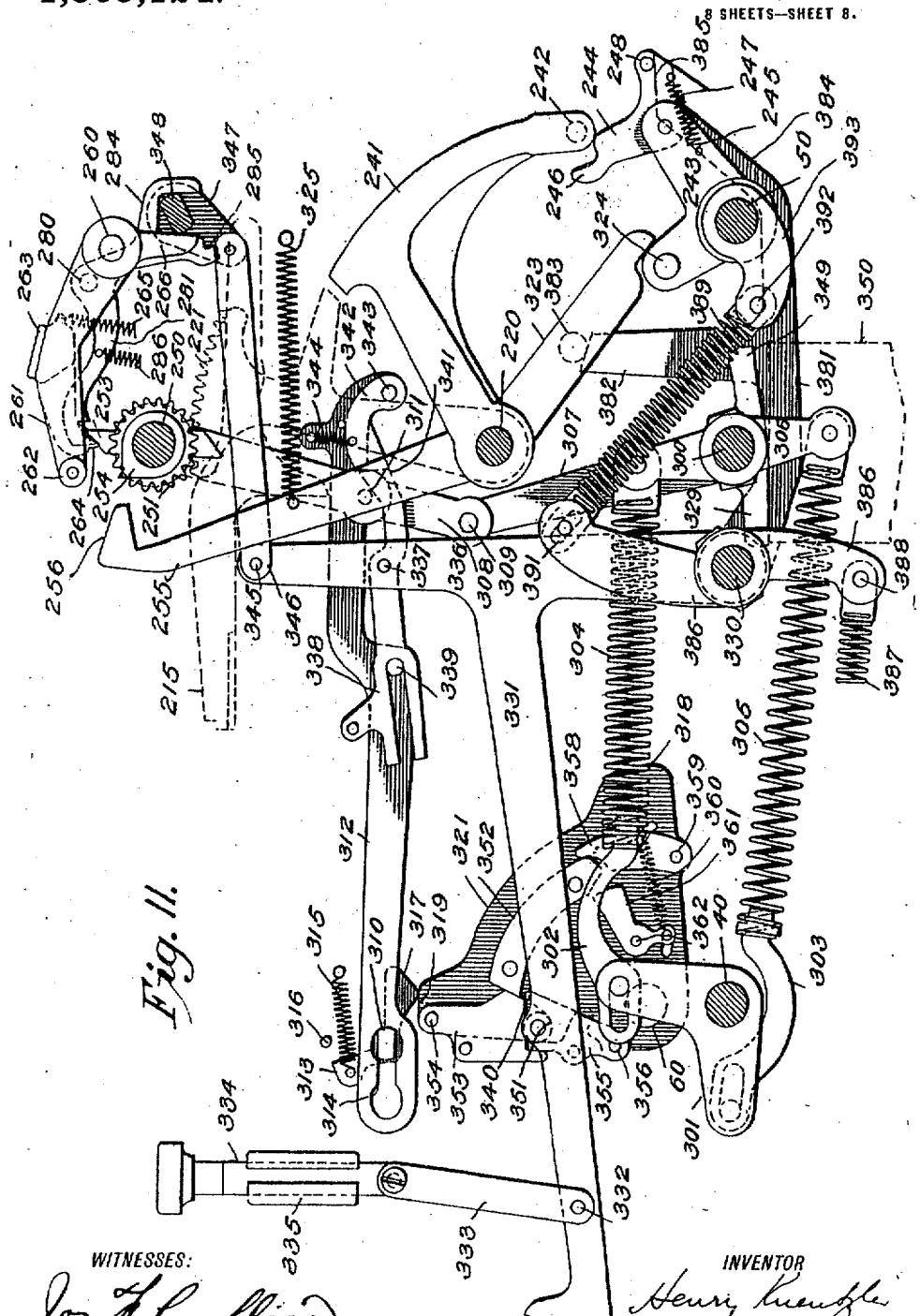

UNITED STATES PATENT OFFICE.

HENRY KUENTZLER, OF LUZERNE, PENNSYLVANIA, ASSIGNOR TO THE ADDER MACHINE COMPANY, OF WILKES-BARRE, PENNSYLVANIA, A CORPORATION OF PENNSYLVANIA.

CALCULATING-MACHINE.

1,305,124.   Specification of Letters Patent.   Patented May 27, 1919.

Original application filed February 13, 1911, Serial No. 608,384. Divided and this application filed April 7, 1916. Serial No. 89,535.

*To all whom it may concern:*

Be it known that I, HENRY KUENTZLER, a citizen of the United States, residing at Luzerne, Luzerne county, Pennsylvania, have invented new and useful Improvements in Calculating-Machines, of which the following is a specification.

This invention is more particularly directed to accumulating mechanisms for calculating machines, including the transfer or carrying devices, with their resetting mechanism and locks, and the zero resetting mechanism.

One object of the present invention is to provide an improved transfer or carrying mechanism, the operation of which is accurate and certain, which is not liable to operate accidentally, and the malicious tripping or manipulation of which is very difficult to effect.

Another object is to provide a novel form of carrying mechanism which does not require the usual idle stroke to reset it, prior to taking a total. With my invention, a total or subtotal may be taken on an operation immediately succeeding an adding operation in which a carry was effected, without an intervening idle stroke.

Still another object is to provide a simplified and novel means to automatically lock the accumulating wheels or counters in mesh with the adding racks or drive members during adding operations and which will be disabled to enable the disengagement of the counters and drive members.

To these and other ends, the invention includes certain novel features and combinations of parts, all of which will be more fully set forth hereinafter and particularly pointed out in the claims.

In the accompanying drawings, Figure 1 is a right side elevation of the accumulating or registering section of a calculating machine, showing the parts in their normal positions of rest;

Fig. 2 is a left side sectional view of the same, taken on line 12—12 of Fig. 5, showing the positions of the parts near the end of the return stroke, the counters being still engaged with their drive members;

Fig. 3 is a similar view, showing the positions of the parts just after a carry has been effected, and prior to the disengagement of the racks and pinions;

Fig. 4 is a detail side view, showing the means which locks the pinions and racks in mesh;

Fig. 5 is a front elevation of a fragment of the accumulator section;

Fig. 6 is a left side sectional view, taken on line 16—16 of Fig. 5, showing the locking mechanism for the carry, the counter being disengaged from the racks when in its "nine" position, and locked against under rotation.

Fig. 7 is a similar view, showing the position of the counter when engaged with its rack, relatively to the carry-tripping and carry-locking mechanisms, just prior to the carrying operation.

Fig. 8 is a similar view, showing the positions of these parts at the carrying period, the carry-locking mechanism being released.

Fig. 9 is a right side sectional view, of the mechanism for shifting the counters relatively to their racks, in combination with the total key control of the counters, and the carry-resetting mechanism, the handle being at the forward limit of its travel, in an adding operation, the counters not being shown.

Fig. 10 is a similar view, showing the normal positions of the parts, and

Fig. 11 is a similar view, with the total key depressed.

This application is a divisional part of the application of Henry Kuentzler, filed February 13, 1911, Serial No. 608,384, and reference is made to the copending applications of Hunter & Kuentzler, filed June 30, 1908, Serial No. 441,231, now Patent 1,177,036, issued March 28, 1916; and Henry Küntzler, filed July 22, 1908, Serial No. 444,836, now Patent #1,068,786, issued July 29, 1913.

Calculating machines of the type to which this invention is applied, are too well known to require an extended description of parts now common in the art.

Such machines comprise a keyboard mechanism, and an accumulator mechanism controlled thereby. The accumulator includes a series of counters operated by spring impelled racks or drive members, whose excursions, when an adding operation is performed, are regulated by the usual index pins or stops set in the paths of the racks by depression of keys on the keyboard.

The racks are normally held against advancing by restraining and restoring means controlled from a main shaft. Turning the latter in one direction withdraws the rack-restraining means to enable the racks to advance. The shaft on its reverse rotation, presses the rack-restraining mechanism against the advanced racks to restore them to normal position.

Ordinarily the counters are disengaged from the racks when the latter advance against the stops, mechanism being operated to engage the counters and racks prior to the return of the latter to normal position.

Transfer mechanism is provided to carry the tens from the counters of lower denomination to those of the next higher order, means being provided to reset the transfer mechanism in readiness to repeat its operation when necessary.

Depression of a total or special key operates mechanism to effect the engagement of the counters and racks prior to the advance of the latter, the travel of the racks being then controlled by the counters which are arrested in zero position by suitable means, to clear the accumulator.

It will thus be seen that the registering or accumulating section comprises a drive mechanism (the racks) adapted to receive or take the reading from the keyboard and impart it to the rotating numeral wheels or counters, transfer mechanism being provided to effect the carry from counters of lower denominations to adjacent counters of higher denominations. Locks are provided to retain the counters against turning, except when they are actuated by the drive or the transfer mechanisms, and to hold the carrying mechanism against improper operation.

Side frames 8°, Figs. 1 to 3, and 5 to 8, carry through shafts 210, 220 and 230 in their lower portion.

Loosely mounted on shaft 210 are a series of L-shaped arms 211, and on the shaft 230 is also loosely mounted a corresponding series of arms 231. The upper ends of arms 211 and 231 are pivoted, at 214 and 216, respectively, to a series of positioning bars 215. These parts have a limited forward and backward motion upon the shafts 210 and 230 as centers. The forward motion, or to the right, as viewed in Figs. 2 and 3, is imparted by means of springs 213 which are attached to arms 211, at the points 212, and to arms 204 mounted on a shaft 200 carried in the upper parts of the side frames 8°. The movement of the shaft 200 in an anti-clockwise direction (Fig. 2), will stretch the springs and cause a forward movement of the positioning bars 215 until the forward extremities 219 of the bars contact with the usual key-set stops 111, (Fig. 10).

As is obvious, the extent of the forward motion of the positioning bars 215 is dependent upon the particular stops which intercept their paths.

The backward motion of this mechanism is imparted by means of a bail 205 carried at the lower extremities of arms 204 and bearing against projections 218 integrally formed on the positioning bars.

To effect this oscillating movement by means of shaft 200, the latter is provided, as shown in Fig. 10, with a cam lever 203, which is oscillated in unison with the main shaft 40, by means of a crank arm 201 mounted on shaft 40 and provided with a roller 202, which is disposed in a cam slot of the lever 203. The oscillating mechanism, thus far described, rocks forward and then backward at each actuation of the machine.

Referring again to Figs. 2 and 3, the shaft 220 has loosely mounted thereon a series of levers 221, the upper parts of which are formed into segmental racks. These levers are secured to the respective positioning bars 215 by pin and slot connections, hereinafter described, and normally shift in unison with the positioning bars and their sustaining arms 211 and 231.

The accumulator system comprises a shaft 250 upon which are mounted a number of pinions 251 adapted to mesh with a corresponding number of the segmental gear levers 221, and numeral wheels 252 fastened to pinions 251 and bearing preferably two series of figures from 0 to 9 arranged in sequence. By means to be subsequently described, the shaft 250 is movable in a vertical plane sufficiently to throw the pinions into and out of mesh with the segmental gears below. It will be stated here that in the normal operation of the machine, the shaft 250 is in its upper position when the positioning bars and segments are moving forward, and this movement, therefore, does not affect the numeral wheels 252. By the time the backward or return movement begins, however, the shaft 250 has been lowered so that the pinions 251 mesh with the segments, and as the bail 205 forces the positioning bars 215 and segments 221 backward, a corresponding degree of movement is imparted to the numeral wheels 252. As all the segments come to rest in a uniform position, it is obvious that the extent of actuation of the numeral wheels depends upon the extent of the prior forward movement of the positioning bars, and this in turn depends upon the values of the stops interposed in the paths of the positioning bars, by the depression of the related keys. By the mechanism thus far described, any number of units represented by a depressed key will be transferred to the related numeral wheel.

To provide for continuous accumulation, however, transfer mechanism is essential, in order that tens may be carried from one wheel to that of the next higher order. This is best shown in Figs. 2, 3, 5, 7 and 8. As shown in Fig. 2, the segmental gear lever 221 is pierced at 228 with an elongated aperture which has a semi-circular recess 228ᵃ at its lower right hand end. Within this aperture is a rotatable semi-cylindrical detent 217, which, when rotated to the position shown in Fig. 3, is adapted to enter the recess 228ᵃ. The detent is pivoted in the positioning bar 215. Its extremity carries a small crank 206 to which is pivoted a light rod or link 224. Intermediate its length, the rod or link has a lug 226 to which a spring 225 is fastened, the other end of the spring being attached to the lever 221. This spring maintains the rod 224 normally in a raised position, and by this means the detent 217 is held in the angular position shown in Fig. 2. A spring 227 joining the lever 221 and the arm 211, holds the lever 221 firmly against the detent 217 at all times. Under these conditions, the parts 211, 221 and 231 move back and forth in perfect unison upon their respective shafts 210, 220, and 230.

The shaft 220 is slotted throughout its length as at 222, and the lower end of the rod or link 224 extends into this slot and is pivoted at 276 (Fig. 6) to a trip mechanism hereinafter described. If the rod 224 be moved downward against the tension of spring 225, the detent 217 will be rotated to the angular position shown in Fig. 3, and the instant it assumes this position, the spring 227 will draw the segment lever to the left relatively to the positioning bar 215, when the detent will occupy the off-set recess 228ᵃ. This movement of the segment lever 221 relatively to the positioning bar 215 is equal to the distance between two teeth of its gear, so that whenever the rod 221 is depressed, the segment gear and the pinion 251 in mesh therewith, will move a distance of one unit, in addition to such movement as may be imparted to them by the positioning bar.

Referring now to Figs. 7 and 8, each numeral wheel pinion is shown equipped with a double cam 253. Pivotally mounted in the framework 8ᵉ, at 270, is a lever 271 which extends below the numeral wheel shaft. This lever is provided with a nose 273 so disposed as to be contacted by the cams 253. The lever also has pivoted to it at 274, a stem or link 275 which is pivoted, at 276, to the lower extremity of rod or link 224, previously described. The lever 271 is held in the normal position shown in Fig. 7, by means of the spring 286.

When the numeral wheel passes from its ninth position to that of zero, as shown in Fig. 8, the lever 271 is cammed downward by the cam 253. The lever, when so depressed, forces the stem 275 downwardly, which in turn, pulls the link or rod 224 down against the tension of the spring 225, to rock the detent 217 until it registers with the extension 228ᵃ of the slot 228 to effect a carry. As shown in Fig. 5, the cams 253 on one numeral wheel serve to trip the carrying mechanism on the wheel of next higher order. The cam 253 passes by the nose 273 of the lever 271, as the counter turns from its "9" to its "0" position, to enable the detent 217 to become effective when the segment 221 is reset.

After the segment has been tripped into the carrying position, as shown in Fig. 3, it is necessary to restore the parts to their original positions, as shown in Fig. 2. To effect this, the segment levers are provided with projections 229 which are engaged by a bail 241 pivoted upon shaft 220. By means to be subsequently described, at the commencement of operation of the machine, the bail 241 is moved forward a short distance, forcing to the right, (viewing Fig. 3), before the positioning bars 215 have begun their movement, all segments that have been tripped. At this time, the pinions are not in mesh with the segments. As soon as the segments have been restored, the detents 217 are snapped into their original positions (Fig. 2) by the springs 225.

In order to attain absolute accuracy in the registration and accumulation of items, especially at high speeds, a double system of locks is provided. The numeral wheel pinions are continuously locked at all times except when they are being actuated by their respective segments, and even in the latter instance, the segments are in mesh with the pinions and serve also to prevent any abnormal displacement. In addition to these precautions, the tripping mechanism to effect the carrying is securely locked against accidental movement or jars.

The means to lock the pinions is best shown in Figs. 3 and 4. A bail 263 is pivoted to a shaft 260 carried by the side frames 8ᵉ. This bail is drawn downward under the constant tension of a spring 265. It is equipped with a comb terminating in a series of detents 264 adapted to enter between the teeth of the pinions 251 and lock them against rotation. In the absence of further mechanism, these detents would hold the pinions locked at all times, whether the numeral wheel shaft is in its upper or its lower position. To unlock the pinions to permit of their actuation by the segments, the following means are employed: At each end of the bail 263 an arm 261 is formed having a roller 262 at its extremity. Arms 255 (Fig. 4) pivoted near the opposite ends of the shaft 220 are each provided with a camming edge 256 on their upper ends. By means to be subsequently described, when the shaft 250 is lowered so that the pinions 251 are in mesh with the segments 221, the arms 255 will move to the left, as viewed in Fig. 4, and the cams 256 engaging the rollers 262, will raise the detents 264 from engagement with the pinions, thus allowing the latter to be turned by the racks 221. In like manner, before the shaft 250 is raised, the arms 255 move to the right, (in Fig. 4), allowing the bail 263 with its detents 264 to engage the pinions 251 before the upward movement of the shaft 250 releases the pinions from the segments.

The above mechanism takes care of the pinions, holding them secure from any possible false movement at all times; the means now to be described performs the same function in regard to the carrying mechanism. It is obvious that the carrying mechanism should be actuated only at such times as the pinions are in engagement with the segments, and that the carrying mechanism should be locked against all movement when the shaft 250 is in its upper position and the pinions disengaged. This is accomplished as shown in Figs. 6 and 7. The tripping levers 271 are each provided with a pin 277 which is adapted to engage with the respective feet 289 of a series of two-armed latches 287 pivoted to shaft 280. One arm 288 of each latch extends under the numeral wheel shaft 250 and remains in continuous contact therewith, owing to the upward pull of spring 265 attached thereto. In Fig. 6, the numeral wheel shaft is shown in its upper position, and the arms 288, following this movement, have shifted the feet 289 of the remaining arms 289 of the latches over the pins 277 on levers 271, as shown in the figure, so that the latter cannot be rocked to trip the carrying mechanism. In Fig. 7, the numeral wheel shaft is shown in its lower position. Its movement to this position has displaced the feet 289 so that they no longer intercept the path of the pins 277 on levers 271, as shown in the figure.

These locks are inoperative during the time the pinions and segments are in mesh, so that to attain absolute accuracy, it is advisable to equip the carrying mechanism with an additional lock which will be operative during eighteen of the twenty positions which may be assumed by the pinions when in mesh with the segments.

This additional lock is best shown in Figs. 6, 7 and 8. The tripping levers 271 are each provided with a tail carrying a shoulder 272. Two-armed locks 281 are pivoted to shaft 280, the horizontal arm of each of which is normally pulled downward by means of the springs 286 attached thereto and to the levers 271. The front ends of the arms, each terminate in a nose 283, the beveled edge of which is engaged by the related cam 253 on the corresponding numeral wheel pinion. The rearward vertical arm of each lock terminates in a toe 285 which engages the shoulder 272 on the corresponding lever 271 and normally locks the latter against rocking, as shown in Fig. 7. At the moment a carry is to take place, as shown in Fig. 8, one of the double cams 253 raises the arm 281 of the lock, moving the toe 285 free from the shoulder 272, and at almost the same instant, the other cam 253 forces the lever 271 downward, to release the detent 217 and effect the carrying, as previously described.

It will be seen from the above description that out of the forty different positions which the numeral wheel pinions may assume, relatively to their actuating means, or drive members, when in and out of engagement therewith, the carrying mechanism is positively locked in thirty-eight of these positions, and is unlocked only in the two positions in which a carry should be made, when the pinions and drive members are engaged.

Still another locking mechanism, however, may be sometimes advisable in order to enable the machine to operate accurately at extremely high speeds. In Fig. 6, the numeral wheel there shown is in its "ninth" position and the numeral wheel shaft 250 is in its upper position. The upper cam 253 has come into contact with and has raised the arm 281. The reaction between the two contacting bevel surfaces shown in the figure, tends to move the cam and its numeral wheel in an anti-clockwise direction. If, therefore, the shaft 250 is moved upward with great violence, and the locking means previously described, do not offer sufficient resistance, the striking of these parts might cause the numeral wheel to be displaced one unit. This is prevented by means of a small projection 282 located on the under side of arm 281. This projection engages the extremity of the cam 253 under the conditions described above and prevents rearward movement of the parts at such time.

The application of power to the register section for the performance of the functions described above is shown in Figs. 9 and 10. The mechanism to move the gear segments back and forth has already been described; there remains the means to move the numeral wheel shaft upward and downward, the means to move the bail 241 to restore the carrying mechanism into potentially operative condition, and the means to lock the numeral wheel shaft in its lower position and raise the locking detents 264 from engagement with the pinions by means of the arms 255.

In Figs. 9 and 10, 300 represents a shaft located in the lower part of the framework and in a vertical plane with the numeral wheel shaft 250. These shafts are connected at their opposite ends by means of toggle links 307 and 308, pivoted together at 309. The links 307 are fast on the shaft 300. Attached to shaft 300 is a double armed lever 306 to the extremities of which are fastened springs 304 and 305. The other ends of these springs are connected by means of links 302 and 303, respectively, to the two arms of a bell crank 301 fastened to the main shaft 40. By this structure the motion of shaft 40 is communicated to shaft 300 through the springs whenever shaft 300 is free to move. Spring 305 is normally tensioned to maintain the toggle links 307, 308 straight, and thus hold the counters 252 out of mesh with their segments 221. Fastened to the upper toggle link on the left side of the machine at 311, is a sliding bar 312 having at its forward end a dumb bell slot 314. A rotatable keeper 310 positioned within the slot supports this end of the bar. The keeper is pivoted at 310 to the side frame and has an arm 313 to which is attached a spring 315, the other end of which is attached to the frame. A pin 316 set in the frame limits the motion of the keeper. The lower part of the keeper is provided with a projection 317 which wipes the extensions 318 and 319 of a quadrant 321 attached to the auxiliary shaft 60, driven in any suitable manner (not shown) by the main shaft 40. For present purposes, the quadrant may be mounted directly on the main drive shaft, as is usual in the Wales machine. The function of the mechanism thus far described is to hold the numeral wheel shaft 250 in its upper position during the forward stroke of the machine until the forward stroke is nearly completed, to move it instantly to its lower position as the forward stroke is completed; to retain the numeral wheel shaft in lowered position with the numeral wheels in mesh with their drive racks 221 during the return stroke, and to move the shaft to its upper position as the reverse stroke is completed.

Its operation is as follows: On the actuation of the main shaft 40 in its forward stroke, the spring 304 is stretched and spring 305 released. The shaft 300 does not move, however, as the extension 319 of quadrant 321 has already moved forward from the position shown in Fig. 10 from under the projection 317, to free the keeper 310 to the action of the spring 315 which has drawn the keeper crosswise in the slot 314. The bar 312 is thereby held against forward movement and the toggle is held in its straight line position, shown in Fig. 10. At the conclusion of the forward stroke of auxiliary shaft 60, however, as shown in Fig. 9, the extension 318 of the quadrant rotates the keeper 310 to its longitudinal position, the bar 312 snaps forward through the impulse of spring 304, which movement breaks the toggle and thereby draws the numeral wheel shaft downward. This shaft, as shown in Figs. 1 and 2, is movable within vertical guides in the side frames 8ª and moves in a line at right angles to a tangent drawn through the pitch line of the gear segment 221. The first movement of the quadrant, on the return stroke, again throws the keeper 310 into effective position, this time holding the bar 312 locked in its forward position and the toggle broken. During the return stroke, spring 305 is put under tension and spring 304 slackened. At the completion of this stroke, as shown in Fig. 10, the extension 319 of the quadrant again releases the keeper to enable the bar 312 to snap backward under the action of the spring 305 to the position shown in the figure, the toggle at the same time being straightened and the numeral wheel shaft 250 elevated.

To deaden the noise caused by the movement of the toggles and numeral wheel shaft, the shaft 300 has keyed to it, a member having two arms 329 and 349 extending from the shaft at a slight angle with each other, as shown in Figs. 10 and 11. Directly under this member is a bed rest 350 with which the arms have alternative contact in accordance with the movement of the toggle. This bed rest acts as a stop to limit the motion of the toggle in each direction, and as the contacting parts have but little relative movement, and that movement being a comparatively slow one, there is no great shock of impact and the mechanism is practically noiseless.

As shown in Fig. 9, the shaft 250 is locked in its lower position by the hooked arms 255 which engage with shouldered collars 254 mounted on the shaft 250. These arms 255 are normally pulled over the shaft by means of springs 325 under constant tension, the arms being pivoted at 220. A depending member 323 is attached to each arm and terminates in a foot adapted to engage the respective pins 324 mounted upon the respective two-armed levers 243 attached to a jack shaft 50 driven from the main shaft 40 by means of a crank 42 (Fig. 10) secured to the main drive shaft and connected by a pitman 43 to a similar crank 44 attached to the jack shaft, so that the main shaft 40 and jack shaft 50 oscillate in unison with each other.

Attached to the crank 44 are a pair of main restoring springs 45, the extreme ends of which are hooked into the base of the machine. These springs return the shafts and connected parts to their original positions after they have been rocked forwardly. When the machine is at rest, as shown in Fig. 10, the pins 324 hold the arms 255 out of locking position. As soon as the jack shaft moves forward, however, the pins are withdrawn from such contact and the arms close in on the shaft 250 as it descends, as shown in Fig. 9.

The bail 241 to restore the carrying mechanism is actuated as shown in Figs. 9 and 10. The bail is formed with a downwardly projecting arm terminating in a stud 242. One of the levers 243 on shaft 50 carries a tappet or pivoted member 244 provided with a stop edge 247, a spring 245 and a lug 246. In the position shown in Fig. 10 with the machine at rest, the arm 243 and pivoted member 244 form a broken toggle with the lug 246 in contact with the stud 242 on the carry resetting member, the spring 247 being tensioned. On the initial forward movement of the shaft 50, when the machine is started on its forward stroke, the toggle is straightened, and this movement imparts an upward thrust to the stud 242 and bail 241 to reset the carrying mechanism, including the segments 221, as described above. As appears from the construction shown, the remaining movement of shaft 50, in the forward direction disengages the tappet 244 from the stud 242 of the carry resetting member to permit the latter to drop back to its normal idle position. As the shaft 50 approaches the end of its return stroke, the tappet 244 contacts the stud 242 to break the toggle, the tappet remaining in contact with the stud 242 when the machine is idle.

By the mechanism thus far described, a numerical amount may be set up on the keyboard by depressing the proper keys, and this amount may be transferred into the register section by operating the main shaft 40. This operation may be repeated as often as desired, the registers accumulating the various amounts transferred to them, the figures on the numeral wheels showing the total sum of the amounts so transferred.

In all of these operations, the position of the gear segments is determined by the set-up on the keyboard. When it is desired that the position of the gear segments should correspond with the figures accumulated in the register, as is necessary in the taking of a total, almost all of the above modes of operation are reversed. The keyboard and its stop mechanism are disabled to allow the gear segments to move freely; the pinions are thrown into mesh with the segments at the beginning of the forward stroke, so that as the segments are drawn forward by their individual springs, the numeral wheels are rotated backward until their cams 253 come into contact with the zero stops 283, and the segments are thus held from further movement after having moved forward a distance proportionate to the displacement of the numeral wheel from its zero position; the pinions may then be disengaged from the gear segments on the reverse stroke, so that the numeral wheels are left in their zero positions, a function that is of equal importance with the transferring of the total from the numeral wheels to the gear segments.

The means to accomplish these results are shown in Figs 10 and 11. In Fig. 10, in which the machine is shown at rest, 334 is the stem of a totaling key located on the left hand side of the machine. The stem is vertically movable in a guide 335 and is connected by a pitman 333, at 332, to a long totaling lever 331 secured to the shaft 330 journaled in the side frames 8°. Below shaft 330, as shown in Fig. 11, is a small extension 386 of the lever, to which is attached a spring 387, at 388, this spring holding the lever and totaling key normally in their upper position, as shown in Fig. 10.

The totaling lever 331 is provided with an upward extension 336, to which, at 337, is pivoted a lever 338 having an open slot at its forward extremity. A pin 339 mounted on the rod 312 and positioned in the slot of lever 338, holds the latter in alinement.

The previously described movement of the numeral wheel shaft is reversed by the following mechanism.

With the machine at rest, as shown in Fig. 10, the lever 338 pivoted to the upward extension of the totaling lever is in contact with the pin 339 fastened to rod 312, as already described. In this condition of the machine, the rod 312 is not locked by the keeper 310, so that a downward movement of the totaling key will cause the rod 312 to move forward. As the rod is connected with the upper toggle link at 311, as described above, the toggle joint is broken and the numeral wheel shaft is drawn downward until the pinions are in mesh with the segments. As this position of the shaft must be maintained during the entire forward stroke of the machine, the totaling key is held locked in its depressed condition against the tension of its restoring spring 387, as follows:

Upon the totaling lever 331 a small roller 351 is mounted. Upon the quadrant 321 mounted on shaft 60 are a series of fixed and movable detents, each of which is adapted to engage the roller 351. The functions of this structure are to hold the total key depressed until the completion of the forward stroke and then to release it, or, if the key be held depressed by the operator until the beginning of the backward stroke, in such case, to hold it depressed until the backward stroke is completed. An arcuate guard 352 constitutes a fixed detent. Pivoted at 354 is a detent 353 which is normally in contact with the forward end of the guard 352, being held in that position by a spring 357 which is also attached to a latch 355 pivoted at 356. At the opposite end of the guard are detents 361 and 358 pivoted at 362 and 359, respectively, and held in operative position by a connecting spring 360.

When the totaling key is depressed, the roller forces detent 358 to the left, as viewed in the figures, and when the key reaches its lowest position, the detent closes over the roller, locking it in that position, as shown in Fig. 11. The key cannot now be released until the machine has begun and completed a forward stroke. In so doing, the quadrant moves about 80 degrees to the left, as shown in Fig. 9, and the roller escapes through the detents 361 and 358, which allow the roller to move past them in that direction. The purpose of these detents 361 and 358 is to prevent the depression of the totaling key immediately after a forward stroke has been completed and the key released, the fixed guard 352 preventing depression of the total key during the return stroke.

In the taking of a sub-total, the totaling key must remain depressed during both the forward and backward strokes of the machine. This is determined by the operator in holding down the key at the conclusion of the forward stroke, at which time it is ordinarily released by the locking mechanism just described. As soon as the reverse movement begins, the key is again locked by the guard 352. It now becomes necessary to release the key at the completion of the backward stroke and as the machine comes to rest. This is done by means of the latch 355. When the totaling key is first depressed and is locked by detent 353, the roller 351 occupies the hollow space in the upper part of latch 355. As the quadrant is moved to the left (in the drawings) on the forward stroke, the latch gives way to the right, allowing the roller to pass under the guard 352. As the quadrant is moved to the right on the return stroke, however, in a sub-totaling operation, the roller contacts with the outside lug 340 of the latch, forcing it to the left, as viewed in the figures. The latch contacts with the lower part of detent 353, and forces it, in turn, to the left. These movements provide a passage for the roller between the detent 353 and the guard 352, and allow the totaling key to resume its upper position.

In the taking of a grand total and the restoring of the numeral wheels to zero, however, the totaling key is released at the end of the forward stroke. At the same time, the numeral wheel shaft is elevated to throw the pinions out of mesh with the segments. The mechanism to effect this latter purpose is shown in Figs. 10 and 11.

The bar 312 projects to the rear beyond the point of its attachment to the upper toggle link at 311. To this rear portion at 343 is pivoted a pawl 342 normally drawn upward by a spring 344. The rear part of lever 338 attached to the totaling lever at 337, terminates in a foot 341 adapted to engage the end of the pawl 342. In the position of parts shown in Fig. 10, the toggle links 307, 308 and bar 312 are free to move in the ordinary course of operation without hindrance from the structure just described. When the total key is depressed, however, as shown in Fig. 11, the angular relation of pivot 337 on the totaling lever 331 to the pin 339 on bar 312 undergoes a change, which results in the rear end 341 of lever 338 moving upward until it abuts the end of pawl 342. When the totaling key is released and moves upward, the lever 338 is carried to the right (in the drawings) owing to the tension of spring 389, hereinafter referred to, and the consequent thrust against the pawl 342 shifts the bar 312 to straighten the toggle links 307, 308 attached thereto. This straightening movement of the toggle raises the numeral wheel shaft 250 to its upper position prior to the return of the toothed segments 221. The power to effect this movement is supplied from the spring 389 shown in Fig. 11. One end of this spring is fastened by a slotted link connection 391 to arm 386 which is attached to shaft 330 and moves with the totaling lever 331. The other end is attached, at 392, to an arm 393 fastened to the jack shaft 50. The slotted link connection allows the depression of the totaling key without the extension of spring 389. On each actuation of the machine, the spring is stretched by the forward movement of the jack shaft, but in the ordinary adding operations, the spring does not oppose the action of the toggle breaking spring 304, because at such times there is no connection between the toggles 307, 308 and the shaft 330.

Depression of the total key 334, rocks the lever 331 and its arm 336 and swings the rear end of the lever 338 into alinement with the pawl 342 on the trip bar 312 connected to the upper toggle link 308 so that at the time the totaling lever is unlocked from the quadrant, at the end of the forward stroke, the spring 389 is at its highest tension, and the power stored therein is utilized to raise the totaling mechanism and the numeral wheel shaft, as described above.

The pin and slot connection 391 permits the totaling key to be depressed with but slight pressure, as only the comparatively light spring 387 offers resistance to its downward movement, while at the same time, it provides ample power for the restoration of the key and attached mechanism to their original positions.

The above described mechanism provides for the meshing of the pinions and segments prior to the forward stroke of the machine; the drawing forward of the segments in the usual manner, and the backward rotation of the numeral wheels to their zero positions. Additional means are necessary in the totaling mechanism to free the numeral wheel shaft and the pinions from their respective locks during the movement just outlined, and also to insure that the stops which limit the backward movement of the numeral wheels are in operative position.

The arms 255 which lock the numeral wheel shaft in its lower position, are disabled by depression of the totaling key, as follows: The totaling lever 331 rocks the shaft 330, on which are mounted backward extensions 381, each of which carries an upstanding projection 382, the upper part of which is adapted to engage a stud 383 fastened to the lower extremities 323 of the respective arms 255. The depression of the key, as shown in Fig. 11, forces the projections 382 against the studs 383 to rock the extremities 323 upward, thereby moving the upper parts of the arms 255 free of the numeral wheel shaft. This movement of the arms 255 would normally allow the detents 264, formerly described, and shown in Fig. 4, to fall into and lock the pinions 251 from movement. This is prevented as follows: As shown in Fig. 11, to the upper extremity 336 of the totaling lever 331 at the point 345 is pivoted a link 346. The other end of this link is attached to a small crank 347, fastened to, and adapted to rotate a flattened bar shown in section at 348. The frame 261, which is pivoted at 260 and carries the detents 264 mentioned above, is provided with a dependent tail 266, so disposed that when the bar 348 is rocked to the position shown, by the depression of the totaling key, the tail is forced to the left (in the drawings), and the frame and detents are prevented from dropping into position to engage the pinions.

Referring now to Fig. 7, the stops which arrest the backward rotation of the numeral wheels when they reach zero position, are formed by the vertical faces 283 of the locking arms 281, previously described. As shown in that figure, the wheel, in its backward or anti-clockwise movement, will carry one of the cams 253 with it until the straight edge of the cam contacts with the edge 283, whereupon the cam, with its attached pinion and numeral wheel, are brought to a stop in zero position. The numeral wheel shown in this figure is in its ninth position and means must be employed to prevent the locking projection 282 from interfering with the above described movement of the wheel by engaging the extremity of the cam. This means consists of an angled projection 284 forming a part of the lever 281. The rocking of the flattened bar 348, by the depression of the totaling key, locks the arms 281 in the positions shown in Fig. 11 and maintains them in that position during the taking of the total. As shown, in this position, the cams 253 will clear the projections 282, but will be arrested by the extremities 283 of the arms, which are nearer to the center of shaft 250, measured on a radial line from the same, than are the projections 282. Such locking action also maintains the levers 281 firmly in position against accidental displacement.

It will be remembered that in the normal operation of the machine, the carrying mechanism is restored to set position at the beginning of the forward stroke, and in the totaling operations described above, the pinions are thrown into mesh with the gear segments at the beginning of the forward stroke. It is necessary, therefore, to disable the restoring means for the carrying mechanism when the totaling key is manipulated; otherwise, the gear segments, during the restoring movement, would tend to actuate such of the pinions as stand at zero and also such segments as have effected a carry during the previous stroke, as the pinions and gear segments have been thrown into mesh by the actuation of the totaling key. As shown in Figs. 10 and 11, the pivoted members or tappets 244, previously described, are each equipped with a pin 248. The extreme rearward parts of the totaling lever extensions 381 are bent upward as at 384, and each terminates in a foot 385. These feet are positioned to contact with the pins 248 attached to the pivoted members 244. When the totaling key is depressed, the feet 385 bear upon the pins 248 and move the members 244 to inoperative position, as shown in Fig. 11.

Changes may be made in the form and arrangement of the several features disclosed without departing from the spirit and scope of this invention.

What I claim as new, is:—

1. In a calculating machine: a transfer mechanism, including a shaft; numeral wheels and pinions; spring-actuated carrying levers; detents restraining said levers; trips to release the detents; means controlled by the numeral wheels to actuate the trips; and means to lock the trips and the detents from operation except at the instant a carry is to take place.

2. In combination; two numeral wheels of adjacent orders; a cam carried by the numeral wheel of lower order; a lever adapted to be actuated by the cam; mechanism to effect a carry into the numeral wheel of higher order when the said lever is actuated; and positive locking means for said lever.

3. In combination; two numeral wheels of adjacent orders; a cam carried by the numeral wheel of lower order; a lever adapted to be actuated by the cam; mechanism to effect a carry into the numeral wheel of higher order when the said lever is actuated; and means to hold said lever rigidly locked at all times except at the instant of its actuation by said cam.

4. In combination; a series of numeral wheels; cams mounted thereon; carrying mechanisms associated with the wheels, including detents which are actuated by the said cams; and positive means to hold the detents locked except at the instant of actuation by the cams.

5. In combination, numeral wheels; carrying mechanisms therefor; locking means for the respective carrying mechanisms; and means on the numeral wheels to disable the locking means, and to trip the carrying mechanisms, respectively.

6. In combination, numeral wheels; actuating racks therefor; means to effect the engagement or disengagement of the wheels and the racks; carrying mechanisms, including trips actuated by the numeral wheels; and means adapted to lock said trips at all times when the numeral wheels and the racks are disengaged.

7. In combination, the carrying trip 271; the locking lever 287 adapted to lock the trip; and the numeral wheel shaft 250 controlling the movement of the lock 287.

8. In combination, numeral wheels; actuating racks therefor; means to effect the engagement or disengagement of the wheels and the racks; carrying mechanisms, including trips actuated by the numeral wheels; and means adapted to lock said trips at all times when the numeral wheels and the racks are engaged except at the point where the numeral wheels are in position to control a transfer.

9. The combination in an accumulating mechanism; of numeral wheels; pinions correlated thereto; slotted actuating racks; and means to engage and disengage the pinions and racks to effect the rotation of the pinions and their respective numeral wheels; means to determine the amount of rotation imparted to the pinions by the racks, including positioning bars; detents journaled in the positioning bars and entered into shouldered slots in the racks; means normally tending to retain the detents in locking position against the shoulders in the slots; numeral wheel-controlled trip members to disable the detents; and means for shifting the racks when the detents are disabled.

10. In an accumulating mechanism for calculating machines, the combination with a series of numeral wheels; and pinions connected to the respective wheels; of a series of driving devices for the numeral wheels, each including a positioning bar; a slotted rack, said slot having a shoulder intermediate its ends; means normally connecting the positioning bar and rack against effective relative movement, said means comprising a shiftable detent normally engaging the shoulder of the slot; trip mechanism for said connecting means, controlled by the numeral wheel of next lower order, and operative to disable the detent while the rack and pinion are in mesh; and means to automatically shift the rack a predetermined distance relatively to the positioning bar when the detent is disabled.

11. In an accumulating mechanism for calculating machines, the combination with a series of numeral wheels, and pinions connected to the respective wheels; of a series of driving devices, for the numeral wheels, each including a positioning bar; a slotted rack, said slot having a shoulder intermediate its ends; means normally connecting the positioning bar and rack against effective relative movement, said means comprising a shiftable detent normally engaging the shoulder of the slot; trip mechanism for said connecting means, controlled by the numeral wheel of next lower order, and operative to disable the detent while the rack and pinion are in mesh; means to automatically shift the rack a predetermined distance relatively to the positioning bar when the detent is disabled; means to return the rack to its normal position; and means to restore the detent to effective position upon such restoration of the rack.

12. In an accumulating mechanism for calculating machines, the combination with a series of numeral wheels; and pinions connected therewith; of a series of driving devices correlated with the respective pinions, each device including a positioning bar; means to advance and retire said bar; a rack for each positioning bar, adapted for movement relatively thereto, and engageable with its correlated pinion; locking means mounted on the positioning bar to normally prevent effective relative movement between the rack and positioning bar; means controlled by the pinion of next lower order to disable said locking means, while the rack and pinion are in mesh; means to shift the rack relatively to the positioning bar when its locking means is disabled; and means to restore the rack and locking means to their normal interlocked positions.

13. In an accumulating mechanism for calculating machines, the combination with a series of numeral wheels and correlated pinions; of driving and transfer mechanism for the numeral wheels, including a series of positioning bars with means to advance and retire said bars; a series of slotted racks controlled by said bars, and with which the pinions mesh; shoulders formed in the slots in the bars; shiftable detents mounted in the positioning bars and normally engaging the shoulders to lock the racks and bars against effective relative movement; tripping mechanism connected with the detents and controlled by the numeral wheels of next lower order to disable the detents; means to shift the racks relatively to their positioning bars when the detents are disabled; means to restore the detents and racks to their mutually interlocked positions; and locking mechanism likewise controlled by the numeral wheels of next lower orders, to prevent the operation of the tripping mechanism, except when said numeral wheels are in predetermined positions.

14. In combination, numeral wheel mechanism, including numeral wheels; actuating racks for said wheels; operating devices for the racks; detents normally connecting the racks and operating devices against effective relative movement; trips actuated by the numeral wheels to disable the detents; means to shift the actuating racks relatively to the operating devices when the detents are disabled; and locks controlled by the numeral wheel mechanism to hold the trips against operation.

15. In combination, numeral wheels; actuating racks therefor; operating devices for the racks; detents normally connecting the racks and operating devices against relative movement; suitably guided rods connected with the detents; springs to hold the detents effective; numeral wheel-controlled trip mechanism connected to the rods, to disable the detents; and means to shift the racks relatively to the operating devices at the time the detents are disabled.

16. In a calculating machine, the combination with a series of numeral wheels mounted on a shaft and shiftable into and out of adding position; of carrying mechanism; tripping devices for said carrying mechanism, including levers; and latches effective to hold said levers against operation, except when the numeral wheel shaft is shifted to a position to render the carrying mechanism effective.

17. In a calculating machine, the combination with a shiftable shaft; and a series of numeral wheels mounted thereon; of carrying mechanism; tripping devices associated with the numeral wheels of lower orders to control the carrying mechanism, and including tripping levers; and latches, one arm of each of which latches extends beneath the shiftable shaft, and the other arm of each of which latches is effective to hold its correlated tripping lever against operation.

18. In a calculating machine, the combination with a shiftable shaft; and a series of numeral wheels mounted thereon; of carrying mechanism; tripping devices associated with the numeral wheels of lower orders to control the carrying mechanism; and latches controlled by the numeral wheel shaft, and effective to lock the carrying mechanism against operation.

19. In a calculating machine, the combination with a shiftable numeral wheel shaft; and a series of numeral wheels mounted thereon; of carrying mechanism; tripping devices for the carrying mechanism; and locks to prevent the operation of the carrying mechanism, one of which is controlled by the numeral wheel shaft, and the other by the numeral wheel.

20. In a calculating machine, the combination with a shiftable numeral wheel shaft; and a series of numeral wheels mounted thereon; of carrying mechanism; tripping devices for the carrying mechanism; and locks to prevent the operation of the carrying mechanism, said locks being successively disabled.

21. In a calculating machine, the combination with a shiftable numeral wheel shaft; and a series of numeral wheels mounted thereon; of carrying mechanism; tripping devices for the carrying mechanism; locks to prevent the operation of the carrying mechanism; and means on the numeral wheels to disable the locks and operate the tripping devices in immediate sequence.

22. In a calculating machine, the combination with a series of numeral wheels; combined drive and transfer members therefor; and retaining mechanism to hold the transfer members in cocked or set positions; said wheels and members adapted for engagement and disengagement; of a locking means to prevent the transfer members from being tripped, except when the wheels and members are engaged.

23. In combination, numeral wheels; normally stationary carrying mechanisms therefor; tripping devices for the carrying mechanisms; positive locking means for the trip devices to hold all parts of the carrying mechanisms in potentially effective position, and against operation; and means to disable the locking means and trip the carrying mechanisms for operation.

24. In a calculating machine, the combination with a series of numeral wheels; of individual transfer mechanisms for the wheels, including means to retain the transfer mechanisms in potentially effective positions; and positive locking means to prevent the improper operation of the transfer mechanisms.

25. In a calculating machine, the combination with a series of numeral wheels; drive members therefor; and means to engage and disengage the drive members and numeral wheels; of a transfer mechanism operative through the drive members; and means to absolutely lock the transfer mechanism against operation, either accidentally or intentionally, when the numeral wheels and drive members are disengaged.

26. In a calculating machine, the combination with a series of rotatable counters; and a series of combined drive and carrying members, adapted for engagement and disengagement; of detents normally adapted to lock the combined members against carrying operations; a plurality of locks to prevent the release of each detent, one of which locks is disabled by the counters when moving into engagement with the members; and means controlled by the respective counters during their rotation to disable the other of said locks.

27. In a calculating machine, the combination with a series of rotatable counters; and a series of carrying members adapted for engagement and disengagement; of detents to restrain the carrying members against carrying operations; a plurality of sets of locks to prevent the release of said detents, one set of which locks is disabled by the counters when shifted into engagement with the carrying members; and means controlled by the respective counters during their rotation to disable the remaining locks at predetermined points in the travel of said counters.

28. In a calculating machine, the combination with a series of counters; and a series of carrying members adapted for engagement and disengagement; of detents shiftable relatively to the carrying members to restrain the carrying members against carrying operations; and latches to prevent the release of the detents, and disabled only during engagement of the counters and carrying members, said latches adapted to be disabled by the act of engagement of the counters and carrying members, and released for effective operation by the disengagement of the counters and carrying members.

29. In a calculating machine, the combination with a series of counters; and carrying members adapted for engagement and disengagement; of detents shiftable relatively to the carrying members, to restrain the carrying members against carrying operations; and latches effective to hold the detents against release except when the counters and carrying members are engaged, said latches adapted to be disabled by the act of engagement of the counters and carrying members, and released for effective operation by the disengagement of the counters and carrying members.

30. In a calculating machine, the combination with an accumulator mechanism, including drive members; a shaft shiftable toward and from the drive members; and a series of numeral wheels individually rotatable upon the shaft; of carrying mechanism; tripping devices for the carrying mechanism; and locks for the tripping devices, and controlled by the shiftable shaft and the rotatable wheels.

31. In a calculating machine, the combination with a series of numeral wheels; combined carrying and drive members therefor; and means to engage and disengage the combined members and numeral wheels; of detent mechanism normally operative to lock the combined members against carrying operations; and means to positively lock the detent mechanism against release, either accidentally or intentionally, when the numeral wheels and drive members are disengaged, and also when they are engaged, except upon the occurrence of a predetermined relation between the individual wheels and their combined carry and drive members.

32. In a calculating machine, the combination with a series of numeral wheels; a single series of combined carry and drive members therefor; means to engage and disengage the combined carry and drive members and the wheels; and detents to normally prevent a carrying operation of the members; of trip devices for the detents, and relatively to which devices the wheels rotate; locks to hold the trip devices against release; and means on the numeral wheels to disable the locks, and to operate the trip devices.

33. In a calculating machine, the combination with a series of numeral wheels; of carrying mechanism relatively to which the numeral wheels are bodily shiftable to engage and disengage therewith; tripping devices for the carrying mechanism, including detents to hold the carrying mechanism in cocked or set position, and levers through which the detents are operated; which levers are operable from the numeral wheels; and latches effective to lock the levers against operation, except when the numeral wheels are engaged with the carrying mechanism, said latches adapted to be disabled by the act of engagement of the numeral wheels and carrying mechanism, and released for effective operation by the disengagement of the numeral wheels and carrying mechanism.

34. In a calculating machine, the combination with a series of rotatable numeral wheels shiftable as a unit in a direction at an angle to their direction of rotation; means to lock the numeral wheels against rotation; transfer mechanism for the numeral wheels; and means to reset the transfer mechanism after its operation; of releasing mechanism to disable the numeral wheel locking mechanism, and operate the transfer resetting mechanism, and common to both.

35. In a calculating machine, the combination with a series of numeral wheels, and drive members therefor, adapted for engagement and disengagement; means to lock the numeral wheels when disengaged from their drive members; a transfer mechanism operative through the drive members; and means to reset the drive members after a transfer; of releasing mechanism to disable the numeral wheel locks when the numeral wheels are in engagement with their drive members; and means to operate the drive member-resetting means, and the releasing mechanism, and common to both.

36. In a calculating machine, the combination with a series of numeral wheels, and drive members therefor adapted for engagement and disengagement; means to lock the numeral wheels when disengaged from their drive members; a transfer mechanism operative through the drive members; and means to reset the drive members after a transfer; of releasing mechanism to disable the numeral wheel locks when the numeral wheels are in engagement with their drive members; and means to successively operate the drive member-resetting means, and the releasing mechanism, and common to both.

37. In a calculating machine, the combination with a series of numeral wheels; drive members therefor; means to engage and disengage the drive members and numeral wheels; transfer mechanism operative through the drive members, to cause them to make an additional step to effect a transfer; detents to normally prevent such carrying operation of the drive members; and numeral wheel-controlled means to trip the detents; of a bail to restore the drive members to normal cocked position; and a positively driven shaft having a toggle device to operate the bail.

38. In a calculating machine, the combination with a series of numeral wheels; drive members therefor; means to engage and disengage the drive members and numeral wheels; transfer mechanism operative through the drive members, to cause them to make an additional step to effect a transfer; detents to normally prevent such carrying operation of the drive members; and numeral wheel-controlled means to trip the detents; of a bail to restore the drive members to normal cocked position; a positively driven shaft having a toggle device to operate the bail; locks to prevent rotation of the numeral wheels when disengaged from their drive members; a releasing means to disable the locks when the numeral wheels are in engagement with their drive members; and means on the positively driven shaft to control the lock-disabling means.

39. In a calculating machine, the combination with a series of numeral wheels; drive members therefor; and a transfer mechanism, operative through the drive members; of trip devices for the transfer mechanism; locks to hold the trip devices idle; and double cams on the numeral wheels; one arm of each lock located in the path of one of the cams on each numeral wheel to be struck thereby to disable the lock just prior to the contact of the remaining cam on said wheel, with the corresponding trip device controlling the transfer mechanism.

40. In a calculating machine, the combination with a series of numeral wheels; drive members therefor; and a transfer mechanism, operative through the drive members; of trip devices for the transfer mechanism; locks to hold the trip devices idle; double cams on the numeral wheels; one arm of each lock located in the path of one of the cams on each numeral wheel to be struck thereby to disable the lock just prior to the contact of the remaining cam on said wheel, with the corresponding trip device controlling the transfer mechanism; and means on the locking arm to prevent reverse rotation of the wheel.

41. In a calculating machine, the combination with a series of numerals wheels; and individual carrying mechanisms therefor, including means to retain said carrying mechanisms in cocked position; of means to positively lock the respective carrying mechanisms against improper manipulation.

42. In a calculating machine, the combination with a series of numeral wheels; and individual carrying mechanisms therefor, including means to retain said carrying mechanisms in cocked position; of means to positively lock the respective carrying mechanisms against improper manipulation; and means to temporarily disable the locking means.

43. In a calculating machine, the combination with a series of numeral wheels; of transfer mechanisms including means to retain said mechanisms in set or cocked positions; means traveling with the numeral wheels to trip said retaining means and permit the operation of the transfer mechanisms; and a safety device to lock the retaining means against being improperly tripped.

44. In a calculating machine, the combination with a series of numeral wheels; of transfer devices for said wheels; means on the numeral wheels to trip the transfer devices; and locking means to prevent the improper tripping of the transfer devices.

45. In a calculating machine, the combination with a series of numeral wheels; of transfer devices for said wheels; means on the numeral wheels to trip the transfer devices; and locking means to prevent the improper tripping of the transfer devices when the machine is in normal idle position.

46. In a calculating machine, the combination with a series of numeral wheels; combined drive and transfer members therefor; and retaining mechanism to hold the members in set or cocked positions; said wheels and members adapted for engagement and disengagement; of a locking device effective to prevent an improper transfer operation when the wheels and members are engaged;

and means turning with the wheels to disable said locking device.

47. In combination, the shaft 250; numeral wheel 252 mounted upon the shaft; the carrying trip 271; the lever 281 adapted to lock the carrying trip; and the double cam 253 mounted on the numeral wheel, and adapted to actuate the carrying trip 271 and the locking lever 281.

48. In combination, the shaft 250; the carrying trip 271; locking lever 281; detent 282 associated with the locking lever; numeral wheel 252; and the double cam 253 mounted on the numeral wheel, the said detent being adapted to prevent backward rotation of the double cam 253 and the numeral wheel.

49. In combination, numeral wheels; carrying mechanisms associated therewith, including trips; and a plurality of locking means for holding said trips normally locked.

50. In combination, numeral wheels; carrying mechanism associated therewith, including trips; and a plurality of levers normally locking said trips.

51. In combination, a shaft; numeral wheels and cams; carrying mechanisms associated therewith, including trips; means to hold said trips locked, except at the instant of actuation by said cams; totaling mechanism, including connections with the said locking means whereby the latter is caused to act as a zero stop in the taking of a total.

52. In combination, the shaft 250; numeral wheel 252 mounted upon the shaft; the carrying trip 271; the lever 281 adapted to lock the carrying trip; the cam 253 adapted to actuate the lever 281 and the trip 271; and the bar 348 connected with the totaling mechanism and adapted to retain the lever 281 substantially stationary in the operation of taking a total.

53. In a calculating machine, the combination with a series of numeral wheels; and drive members therefor, adapted for engagement and disengagement; transfer mechanism operative through the drive members during the engagement of the drive members and numeral wheels; trip devices for the transfer mechanism, including levers; locks to hold the levers inactive until a transfer is to be effected; and clearing mechanism; of means on the numeral wheels to disable the locks and to trip the levers; said locks lying in the paths of their disabling means to arrest the numeral wheels in a clearing operation.

54. In a calculating machine, the combination with a series of numeral wheels; drive members therefor; a transfer mechanism operative through the drive members; trip devices for the transfer mechanism; and a clearing mechanism; of locks to hold the trip devices against operation; and means on the numeral wheels to release the locks, said locks being also effective to arrest the numeral wheels in a clearing operation.

55. In a calculating machine, the combination with a main drive shaft; a numeral wheel shaft; numeral wheels mounted thereon; racks to turn the wheels; and supporting means to engage and disengage the numeral wheels and their racks; of a flexible drive directly connecting the main drive shaft and the supporting means to effect the engagement and disengagement of the wheels and their racks; and locking devices to hold the wheels and racks in mesh.

56. In a calculating machine, the combination with a main drive shaft; a numeral wheel shaft; numeral wheels mounted thereon; racks to turn the wheels; and supporting means to engage and disengage the numeral wheels and their racks; of a flexible drive directly connecting the main drive shaft and the supporting means to effect the engagement and disengagement of the wheels and their racks; means to prevent rotation of the wheels when out of mesh with their racks; and locking means to temporarily disable the rotation-preventing means; and to hold the wheels and racks in mesh.

57. In a calculating machine, the combination with a main drive shaft; numeral wheels, and drive members adapted for engagement and disengagement; of flexible means controlled from the main drive shaft to effect the engagement and disengagement of the numeral wheels and their drive members; a lock to hold the numeral wheels against shifting under the influence of the flexible means; and means operated from the main drive shaft to control the lock.

58. In a calculating machine, the combination with a main drive shaft; numeral wheels, and drive members adapted for engagement and disengagement; of flexible means to effect the engagement and disengagement of the numeral wheels and drive members; a lock to resist the action of the flexible means on the numeral wheels; and a driven cam to control the lock.

59. In a calculating machine, the combination with a main drive shaft; numeral wheels, and drive members adapted for engagement and disengagement; of flexible means to effect the engagement and disengagement of the numeral wheels and drive members; a lock to resist the action of the flexible means on the numeral wheels; and a driven cam to alternately disable the lock, and free it for effective operation.

60. In a calculating machine, the combination with a main drive shaft; numeral wheels; drive members; and supporting means for the numeral wheels; of resilient means operable through the supporting means to engage and disengage the numeral wheels and drive members; a bar connected to the supporting means; a detent coacting with the bar to lock the supporting means against premature operation by the resilient means; and a cam operated from the main drive shaft, to control the detent.

61. In a calculating machine, the combination with a main drive shaft; numeral wheels; drive members; and supporting means for the numeral wheels; of resilient means operable through the supporting means to engage and disengage the numeral wheels and drive members; a bar connected to the supporting means; a detent coacting with the bar to lock the supporting means against premature operation by the resilient means; and a rocking cam adapted to disable the detent at opposite ends of its stroke, and free the detent for effective action intermediate the ends of its stroke.

62. In a calculating machine, the combination with a main drive shaft; numeral wheels and drive members adapted for engagement and disengagement; means to support the numeral wheels in disengaged position; a total or clearing key; a bar connected to the supporting means; a lever operated by the key to shift the bar and engage the numeral wheels and drive members; means on the bar engaged by the lever when shifted by the key; and a spring tensioned by the main drive shaft and adapted to operate through the lever and bar to disengage the numeral wheels and drive members.

63. In combination, a shaft; numeral wheels mounted upon the shaft; actuating mechanism for said wheels; means to cause the engagement and disengagement of the wheels and actuating mechanism; locks to prevent rotation of the wheels; and a second locking means adapted to lock the wheels and the actuating mechanism together and to disable the first named locks.

64. In combination, a shaft; numeral wheel pinions mounted upon the shaft; actuating racks for said pinions; means to cause the engagement and disengagement of the pinions and the racks; locks to prevent rotation of the pinions; and means adapted to lock the pinions and racks together during engagement and to disable the said locks.

65. In combination, a shaft; numeral wheel pinions; locks to hold said pinions from rotation; and totaling mechanism, including means adapted to disable the said locks.

66. In a calculating machine, the combination with a series of numeral wheels and drive members adapted for engagement and disengagement; of means to lock the numeral wheels and drive members in engagement; and a key to disable the locking means.

67. In a calculating machine, the combination with a series of numeral wheels and drive members adapted for engagement and disengagement; and detents to hold the wheels against rotation when disengaged from their drive members; of a key to disable the detents.

68. In a calculating machine, the combination with a series of numeral wheels, and drive members adapted for engagement and disengagement; of a series of detents to lock the numeral wheels against rotation; locking means to disable the detents and hold the numeral wheels in engagement with their drive members; and a key to disable both the locking means and detents.

69. In a calculating machine, the combination with a series of numeral wheels, and drive members adapted for engagement and disengagement; and transfer mechanism operating through the drive members; of locks to hold the transfer mechanism idle; means on the numeral wheels to release the locks and trip the transfer mechanism; stops on the locks to prevent reverse rotation of the numeral wheels; and a key to hold the locks substantially stationary to disable the stops and permit the locks to arrest the numeral wheels in zero position.

70. In a calculating machine, the combination with a series of numeral wheels, and drive members adapted for engagement and disengagement; transfer mechanism operative through the drive members; and resetting mechanism for the drive members and transfer mechanism; of a key to disable the resetting mechanism.

71. An adding machine; actuating mechanism therefor; a manually operable totaling key; and means to restore the key by power derived from the actuating mechanism, after manipulation of the key.

72. An adding machine, actuating means therefor; a totaling key; and totaling mechanism adapted to be placed in operative position by manual depression of the said key; of means to restore the totaling key and totaling mechanism to inoperative position, the said restoring means controlled by and deriving its power from the said actuating means.

73. In a calculating machine, the combination with a series of counters, and a series of carrying members adapted for engagement and disengagement; of releasable detents to restrain the carrying members against carrying operations; displaceable latches effective to positively lock the detents in operative position while the counters are disengaged from the carrying members, the latches being automatically rendered ineffective by the engagement of the counters with their carrying members; and means controlled by the counters to release the detents only during such period of inoperativeness of the latches.

74. In a calculating machine, the combination with a series of counters, and a series of carrying members adapted for engagement and disengagement; of releasable detents to restrain the carrying members against carrying operations; displaceable latches effective to lock the detents in operative position against release, when the counters are disengaged from their carrying members, the latches being automatically displaced only upon and during the engagement of the counters and carrying members, and automatically restored to effective position upon and by the disengagement of the counters and carrying members; and means controlled by the counters to release the detents during the period when the latches are displaced.

75. In a calculating machine, the combination with a series of numeral wheels; of a combined carry and drive mechanism therefor, including traveling toothed members and positioning bars adapted for relative movement to effect a carry, said toothed members also shiftable relatively to the positioning bars in resetting operations after the occurrence of a carrying operation; detents to lock the toothed members and positioning bars against effective movement at all other times; said detents mounted in and traveling with the toothed members and positioning bars; and numeral wheel-controlled means to disable the detents.

76. In a calculating machine, the combination with a series of numeral wheels; of a combined carry and drive mechanism therefor, including traveling toothed members and positioning bars adapted for relative movement to effect a carry, said toothed members also shiftable relatively to the positioning bars in resetting operations after the occurrence of a carrying operation; detents to lock the toothed members and positioning bars against relative movement at all other times; trip mechanism to control the detents; means to normally lock the trip mechanism against operation; and means to disable the trip-locking means, and actuate the trip mechanism independently.

77. In a calculating machine, the combination with a series of numeral wheels; of combined carry and drive members therefor; detents to lock the combined members against a carrying operation, the detents mounted in and traveling with the combined members; trip mechanism for the detents; and means to normally lock the trip mechanism against operation.

78. In a calculating machine, the combination with a series of numeral wheels; carrying mechanism therefor, and relatively to which the numeral wheels are shiftable; detents to normally lock the carrying mechanism against operation; and trip mechanism to disable the detents: of separate, independently operable sets of locking means to hold the trip mechanism against actuation, the individual members of one of which sets are disabled by the corresponding numeral wheels at a predetermined point in their rotations; and the other of which sets is disabled when the numeral wheels are engaged with the carrying mechanism.

79. In a calculating machine, the combination with a series of numeral wheels; combined drive and carrying members for the wheels, and relatively to which the wheels are shiftable; and restraining means to normally lock the combined drive and carrying members against carrying operations; of numeral wheel controlled tripping devices for the restraining means, including levers; latches effective to lock the levers against operation; and a moving part of the machine adapted to disable the latches as an incident to shifting the numeral wheels to a position in which the carrying operation will be effective.

HENRY KUENTZLER.